United States Patent
Kirschenbaum

(10) Patent No.: US 6,434,118 B1
(45) Date of Patent: Aug. 13, 2002

(54) METHOD FOR DETERMINING ROUND TRIP TIME UTILIZING ATM TRAFFIC MANAGEMENT MECHANISM

(75) Inventor: Ilan Kirschenbaum, Petach-Tikva (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/228,212

(22) Filed: Jan. 11, 1999

(51) Int. Cl.[7] .......................... H04L 12/26; H04L 12/56
(52) U.S. Cl. ............................... 370/236.1; 370/236.2; 370/241.1; 370/249; 370/252; 370/397; 370/395.21; 370/409
(58) Field of Search ............................. 370/230, 230.1, 370/235, 236, 236.1, 236.2, 237, 241.1, 249, 252, 253, 389, 395.1, 396, 397, 395.21, 400, 409

(56) References Cited

U.S. PATENT DOCUMENTS

| | | | | | |
|---|---|---|---|---|---|
| 5,764,626 | A | * | 6/1998 | VanDervort | 370/232 |
| 5,812,527 | A | * | 9/1998 | Kline et al. | 370/232 |
| 5,812,528 | A | * | 9/1998 | VanDervort | 370/235 |
| 5,920,558 | A | * | 7/1999 | Saito et al. | 370/359 |
| 6,148,001 | A | * | 11/2000 | Soirinsuo et al. | 370/420 |

OTHER PUBLICATIONS

S. Keshav, "An Engineering Approach to Computer Networking", Chapter 12 Addison–Wesley, 1997.

* cited by examiner

Primary Examiner—Alpus H. Hsu
(74) Attorney, Agent, or Firm—McDonnell Boehnen Hulbert & Berghoff

(57) ABSTRACT

A method of measuring the Round Trip Time (RTT) if a Virtual Circuit (VC) utilizing the Traffic Management mechanism of ATM. The RTT is measured in real time individually for each new opened VC and/or for existing VC routes in the network. In addition, the RTT measurement method of the present invention can be used to determine the CRM parameter for a VC on an end to end basis, e.g., user to user or LEC to LEC, so as to achieve better performance of the network. The invention comprises a first embodiment that utilizes the SN field of a RM cell in measuring the RTT and a second embodiment that does not utilize the SN field in measuring the RTT. In addition, an application of the method is presented in determining the CRM parameter within the TM descriptor.

19 Claims, 7 Drawing Sheets

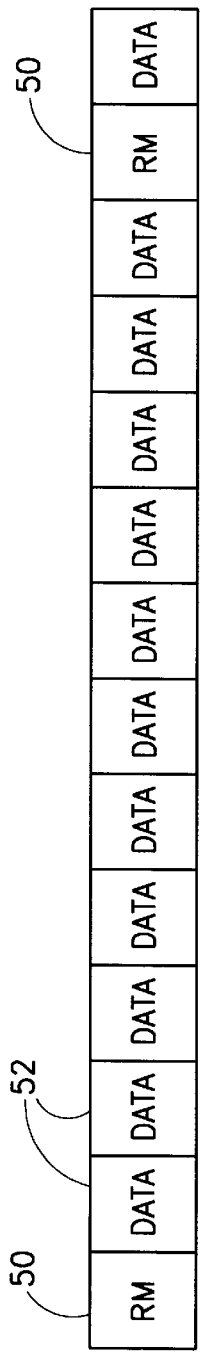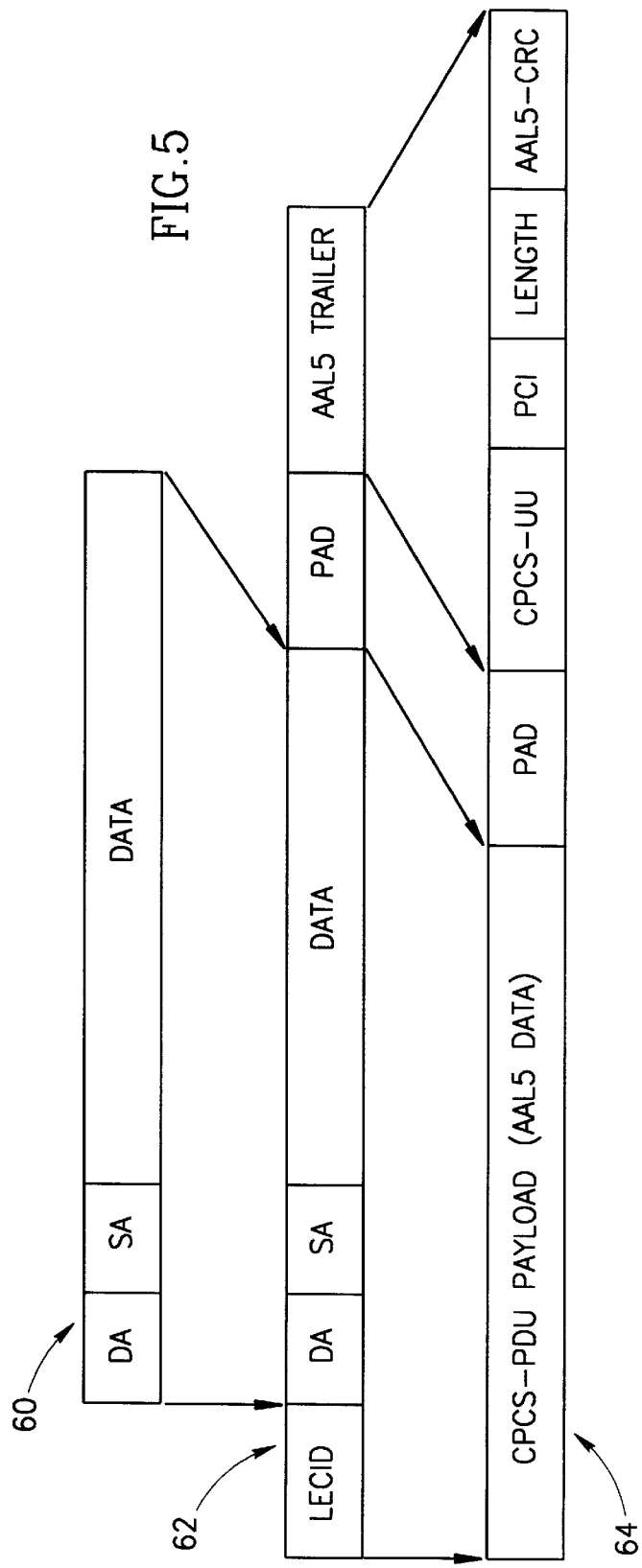

METHOD FOR DETERMINING ROUND TRIP TIME UTILIZING ATM TRAFFIC MANAGEMENT MECHANISM

FIELD OF THE INVENTION

The present invention relates generally to data communication networks and more particularly relates to a method for determining the Round Trip Time between a source end station and a destination end station utilizing the ATM Traffic Management mechanism.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network to Network Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

The Interim Local Management Interface (ILMI) for the PNNI protocol specification provides an auto-port configuration capability. This capability functions to minimize manual configuration operations for PNNI ports of switches. The Phase 0 solution to auto-port configuration is based on hop by hop routing utilizing a 'best match' scheme. The Phase 1 PNNI based solution is based on Open Shortest Path First (OSPF) with the additions necessary for ATM. This scheme is essentially a 'source routing' scheme whereby each node has basic knowledge of the structure of the entire network and uses this knowledge to build a complete path from the source to the destination. When a connection is to be set up from a source to a destination, the source sends out a SETUP message that has within it the address of the destination. Each ATM network node along the way reads the next node from the SETUP message and forwards the message to an appropriate next node. This continues until the SETUP message arrives at its destination.

In the IISP Phase 0 specification standard, the ATM nodes in the network route the signaling SETUP message hop by hop (i.e., node by node) using a 'best match' scheme. ATM addresses are 20 bytes long but only 19 bytes can be used for routing purposes. According to the IISP Phase 0 standard, several prefixes of the ATM address for each link can be registered.

When a node (i.e., an ATM switch) needs to decide to which particular node to route the received SETUP message to, it compares the destination address with all the registered addresses for all of its ports. Only if an address prefix is found that fully matches the destination address can the destination address be considered for routing. After all the prefixes are compared, the prefix address that is the longest is used to determine the routing of the SETUP message. It is important to note that the standard does not require the transfer of any routing information between two neighboring nodes. In addition, the standard also does not permit the use of a TRANSIT NET ID parameter during the signaling phase, which can be used to route to a different routing domain.

A disadvantage of this scheme is that all the prefixes of all neighboring nodes must be registered manually on each of their respective ports. For example, if a port is disconnected from a neighbor and connected to a new neighbor, then the registered addresses must be manually changed in both nodes. This type of network can be termed an absolute static network.

The ATM Header

The components of the ATM header consist of the following fields. A generic flow control (GFC) field provides flow control; a virtual path identifier (VPI)/virtual channel identifier (VCI) field allows the network to associate a given cell with a given connection; a payload type identifier (PTI) field indicates whether the cell contains user information or management related data and is also used to indicate a network congestion state or for resource management (i.e., the EFCI state which is encoded in the PTI field); a cell loss priority (CLP) field indicates that cells with this bit set should be discarded before cells with the CLP bit clear; a header error check (HEC) field is used by the physical layer for detection and correction of bit errors in the cell header and is used for cell delineation.

The provisioning of an ATM network connection may include the specification of a particular class of service. The following list the various classes of service currently defined in ATM. Constant bit rate (CBR) defines a constant cell rate and is used for emulating circuit switching (e.g., telephone, video conferencing, television, etc.). Variable bit rate (VBR) allows cells to be sent at a variable bit rate. Real-time VBR can be used for interactive compressed video and non real-time can be used for multimedia e-mail.

Available bit rate (ABR) is designed for data traffic (e.g., file transfer traffic, etc.) and is the class service connected with resource management. The source is required to control its rate depending on the congestion state of the network. The users are allowed to declare a minimum cell rate, which is guaranteed to the virtual circuit by the network. ABR traffic responds to congestion feedback from the network.

Both switches and end stations in the network implement ABR. Binary switches monitor their queue lengths, set the PTI for congestion state (EFCI) in the cell headers, but do not deal with the computation of explicit rate feedback when congestion occurs.

Explicit rate switches compute the rate at which a source end station can transmit and place this information in the explicit rate field in the returning resource management cell. The destination sends one resource management cell for every N data cells transmitted. If the source does not receive a returning resource management cell, it decreases its allowed cell rate. This results in the source automatically reducing its rate in cases of extreme congestion.

In the case when the source receives a resource management cell, it checks the congestion indication flag (CI bit), after which the sending rate may be increased. If the flag is set, then the sending rate must be reduced. After this stage, the rate is set to the minimum of the above and the explicit rate field.

A fourth class of service, unspecified bit rate (UBR), is utilized by data applications that are not sensitive to cell loss or delay and want to use leftover capacity. During congestion, the cells are lost but the sources are not expected to reduce their cell rate.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Traffic Management

Traffic management (TM) can be defined as the process by which the flow of cells from one device to another within the ATM network is controlled in order to allow for the greatest possible flow rate for the longest possible periods of time. ATM network congestion is defined as a state of network elements (e.g., switches, concentrators, etc.) in which the network is not able to meet the negotiated network performance objectives for the already established connections, resulting in lost cells. ATM layer congestion can be caused by unpredictable statistical fluctuation of traffic flows or fault conditions within the network. The purpose of traffic management is to ensure that users get their desired quality of service. During periods of heavy loads, when traffic cannot be predicted in advance, ensuring quality of service presents a problem. This is the reason congestion control is the most essential aspect of traffic management.

Traffic management refers to the set of actions taken by the network to avoid congested conditions. Congestion control refers to the set of actions taken by the network to minimize the intensity, spread and duration of congestion. These actions are triggered by congestion in one or more network elements. In general, the following traffic and congestion control functions are available within ATM networking.

The ATM standard defines a standard mechanism for the ATM network for indicating congestion states (e.g., setting the EFCI encoded in the cell header) and for indicating cell loss priority for selecting which cell to drop first in case congestion exists. Explicit forward congestion indication (EFCI) is a congestion notification mechanism that the ATM layer service user may make use of to improve the utility that can be derived from the ATM layer. A network element sets the EFCI in the cell header in an impending congested or already congested state. A congested network element can selectively discard cells explicitly identified as belonging to a non-compliant ATM connection and/or those cells with their CLP bit set. This is to protect cells without their CLP bit cleared from being discarded for as long as possible.

For ABR traffic, the ATM forum has defined a traffic management scheme that uses Resource Management (RM) cells to control the traffic rate through the network based in part on the EFCI mechanism defined previously. With reference to FIG. 1, a source end station (SES) 20 inserts forward RM cells into the ATM network 22. The destination end station (DES) 24, upon receiving these forward RM cells, turns them around and sends them back as backward RM cells.

Implicit Rate ABR

In prior art implicit rate control, if there has been congestion on the forward path (recognized at the DES (FIG. 1) by the EFCI bits of the incoming data cells), a congestion field in the backward RM cell is marked (i.e. set to a '1'). The SES 20 receives the backward RM cell and acts upon it. If the congestion field indicates a congestion or if the RM cell is not returned, the sending rate is reduced. When the SES 20 receives a backward RM cell with the congestion field not indicating a congestion, it may increase the sending rate on that particular virtual circuit (VC).

Explicit Rate ABR

Explicit rate control enhances the implicit rate control by adding an explicit rate field to the RM cell. In this field, the SES indicates the rate at which it would like to transmit. If an explicit rate switch exists in the VC route it may reduce the value in the explicit rate field in the backward RM cells in case of congestion. In this case (the example in FIG. 1) explicit rate for the SES is indicated. The SES upon receiving the RM cells, adjusts its sending rate according to the explicit rate fields.

A block diagram of a portion of a typical ATM edge device 12 (i.e. a device that resides on the outer border of an ATM network) is illustrated in FIG. 2. A data source 15 is shown coupled to a cell generator and scheduler 14 which, in turn, is coupled to a cell data buffer 16 and a physical interface 18. Data source 15 may be any device or system that supplies data to be transported over the physical media, e.g., Token Ring, Ethernet, video conferencing, etc. The function of physical interface 18 is to couple transmit and receive data from the physical media to cell generator/ scheduler and traffic management module 14. Cell data buffer 16 functions as a temporary holding memory until cell generator/scheduler and traffic management module 14 has finished processing cells. The module functions to transmit cells at the current transmit rate and modify the transmit rate in accordance with traffic management direction.

A diagram illustrating the fields and their positions in a standard Traffic Management RM cell is shown in FIG. 3. The cell format 40 is shown in increasing byte order starting with byte number one. The ATM header comprises bytes 1–5. The protocol ID comprises byte 6. Byte 7 comprises a direction (DR) bit (forward=0, backward=1), a BECN cell indicator (a 1 if switch generated), a congestion indication (CI) bit (a 1 if congestion present), a no increase (NI) bit (a 1 means do not increase rate), a request acknowledge (RA) bit and a 3 bit reserved field. The explicit cell rate (ER) comprises bytes 8–9. Bytes 10–11 comprise the current cell rate (CCR). Bytes 12–13 comprise the minimum cell rate (MCR). The queue length indicator (QL) comprises bytes 14–17. The sequence number (SN) (an integer number) comprises bytes 18–21. Bytes 22–51 and a portion of byte 52 are reserved. A CRC-10 field occupies the remainder of byte 52 and byte 53.

In order to implement traffic management functions and the handling of RM cells, the prior art approach is to modify cell scheduler 14 to include traffic management functions. The disadvantage of this approach is that this is usually a complex and expensive process. In addition, if traffic management functions are to be incorporated into other different cell schedulers, the process must be repeated for each one.

Traffic Management Descriptor

One of the drawbacks, however, of the ATM protocol is its complexity. The protocol requires the setup of numerous parameters prior to the operation of the network and prior to the establishment of each call connection. The Traffic Management mechanism utilizes transmission descriptors in the performance of its tasks. The descriptors comprise a plurality of parameters that characterize the transmission behavior of the SES and are described below.

| | |
|---|---|
| PCR | Peak Cell Rate to which the rate of the VC can reach. |
| MCR | Minimum Cell Rate to which the rate of the VC can be reduced. |
| ICR | Initial Cell Rate, the rate at which a source should send initially and after an idle period. |
| RIF | Rate Increase Factor, controls the amount by which the cell transmission rate may increase upon receipt of a RM cell. |
| Nrm | the maximum number of data cells a source may send between two successive RM cells. |
| Mrm | controls allocation of bandwidth between forward RM cells, backward RM cells and data cells. |
| RDF | Rate Decrease Factor measured in percent. The multiplicative rate reduction applied upon Congestion Indication (CI), e.g., the rate is reduced by 93% |
| ACR | Allowed Cell Rate, the current rate at which a source is allowed to send. |
| CRM | missing RM cell count, i.e., the number of lost RM cells permitted before reducing the transmission rate. CRM limits the number of forward RM cells which may be sent in the absence of received backward RM cells. For example, for CRM = 1, if a RM cell is about to be transmitted, after Nrm data cells have been transmitted and the previous RM cell has not yet been received, a rate reduction would occur. |
| ADTF | ACR Decrease Time Factor is the time permitted between sending RM cells before the rate is decreased to ICR. |
| Trm | provides an upper bound on the time between forward RM cells for an active source. |
| FRTT | the Fixed Round Trip Time, the sum of the fixed and propagation delays from the source to a destination and back. |
| TBE | Transient Buffer Exposure, the negotiated number of cells that the network would like to limit the source to sending during startup periods, before the first RM cell returns. |
| CDF | Cutoff Decrease Factor, controls the decrease in ACR associated with CRM. |
| TCR | Tagged Cell Rate, limits the rate at which a source may send out of rate forward RM cells. |
| AIR | Rate Increase Factor measured in Mbps. The additive rate increase applied when no congestion is detected, e.g., the rate is increased by 1 Mbps. |
| XDF | Rate Decrease Factor at lost RM cell measured in percent and usually take as the RDF. |

The CRIM parameter was previously known as the XRM parameter but is currently referred to now as the missing RM cell count or CRM parameter. The CRM field of the Traffic Management descriptor represents the missing RM-cell count that limits the number of forward RM cells that may be sent in the absence of received backward RM cells. In other words, the CRM parameter determines the number of RM cells that can be lost before the VC transmit rate is decreased. For example, if CRM equals 2 and RM cell #5 is about to be transmitted, but RM cells #3 and #4 have not been received yet, the VC transmit rate should be decreased since if the RM cell #5 is sent it could get lost due to congestion in the network.

Note that almost all the other Traffic Management descriptor parameters, e.g., Nrm, PCR, MCR, etc., can be set with values determined a priori. The CRM parameter, however, is strongly dependent on the network topology, i.e., number of hops, and the devices that are in use in the network. In the prior art, the setup of the CRM parameter utilizes the cooperation of one or more network elements during setup or, in the alternative, the CRM parameter is set a priori to a particular value. Note also that bad or incorrect tuning of the CRM parameter (either too high or too low) can lead to a major reduction in performance when using Traffic Management in ATM networks.

As another example, consider a call connection set up between a source end station and a destination end station over a path that comprises a large number of hops. Suppose the CRM Parameter is set to a default value of 1 and the Nrm field (the maximum number of cells a source may send for each forward RM cell) is set to a default value of 32. Data cells begin to be transmitted into the long VC. The transmitting source end finishes transmitting the 32 data cells and transmits the RM cell.

The source end station then examines its receiver waiting for the transmitted RM cell to return. Assume the transmitted RM cell is not received for a relatively long time due to long RTT (many hops) or due to congestion in the network The RM cell did not get lost but the RTT is too long. Since the CRM parameter is not set to a proper value, the source end station, in response to the long RTT, needlessly reduces the transmission rate that results in a reduction of performance.

One the other hand, if CRM is set to too big a value, it will be discovered too late that one or more RM cells were lost, which also leads to degradation of performance. Note that the Nrm parameter can be set to a value less than 32 for fast response to network congestion with the consequence that more RM cells are generated.

Note also that, in connection with the TBE parameter, some vendors do not implement the software option specified by the TBE parameter, thus the CRM parameter must be set a priori in these products.

SUMMARY OF THE INVENTION

The present invention is a method of measuring the Round Trip Time (RTT) of a Virtual Circuit (VC) utilizing the Traffic Management mechanism of ATM. The RTT is measured in real time individually for each new opened VC and/or for existing VC routes in the network. In addition, the RTT measurement method of the present invention can be used to determine the CRM parameter for a VC on an end to end basis, e.g., user to user or LEC to LEC, so as to achieve better performance of the network.

The invention comprises a first embodiment that utilizes the SN field of a RM cell in measuring the RTT and a second embodiment does not utilize the SN field in measuring the RTT. In addition, an application of the method is presented in determining the CRM parameter within the TM descriptor.

The method of the present invention is applicable in networks that implement a Traffic Management (TM) mechanism such as specified by the ATM standard in Traffic Management Specification Version 4.0, incorporated herein by reference. The Traffic Management specifications as formed by the ATM Forum specify an end to end congestion control algorithm, i.e., the implicit portion. Three tables may be used for controlling the transmission rate of an individual virtual circuit: (1) Increase table, (2) Decrease table and (3) Xdecrease table.

In operation, the method of the present invention functions to measure the RTT using these three tables. The source end station transmits a known number of data cells and two RM cells. If the transmission rate decreases, it means that the second RM cell did not arrive on time and probably was lost or delayed indicating congestion in the network. CRM is then increased and the RTT measurement is repeated. If the transmission rate did not decrease, Nrm and CRM are assigned new values and the RTT measurement is repeated.

A binary search algorithm is used to set the Nrm and CRM values for each iteration of the method. Once the values converge, the RTT is calculated by multiplying the number of data cells by the transmit time of a data cell and adding twice the transmit time of a RM cell.

The invention also discloses several applications of the RTT measurement method of the invention. One application is in the automatic setup of the CRM Traffic Management descriptor parameter accordingly. Another application is in the measurement of the RTT between two edge devices. A third application is establishing and maintaining a VC between each LEC and continuously or periodically measuring the RTT utilizing the TM mechanism.

There is provided in accordance with the present invention a method for measuring the Round Trip Time (RTT) of a Virtual Circuit (VC) utilizing the Asynchronous Transfer Mode (ATM) Traffic Management (TM) mechanism, the method comprising the steps of initializing the CRM and Nrm parameters in the TM descriptor, neutralizing the Decrease and Increase tables within the TM mechanism, setting the transmission rate to a first rate value, setting the Xdecrease table entry corresponding to the first rate value to a second rate value, neutralizing the entry corresponding to the second rate value, flushing the VC before each iteration, transmitting a plurality of data cells such that a first Resource Management (RM) cell and a second RM cell are transmitted, increasing the value of CRM if the transmission rate decreases indicating that the second RM cell did not arrive in time due to loss or RTT being longer than the time represented by the time between the first RM cell and the second RM cell, assigning new values to CRM and Nrm if the transmission rate did not decrease and calculating RTT once the CRM and Nrm values converge.

The step of neutralizing the entry corresponding to the second rate value comprises the step of placing the second rate value in the entry corresponding to the second rate value.

The step of flushing the VC may include the step of using an Operation And Maintenance (OAM) cell in loopback mode; using the Sequence Number (SN) field of an RM cell for identification purposes, wherein a single counter is implemented for all VCs; using the Sequence Number (SN) field of an RM cell to confirm whether the VC was flushed by sending and receiving an RM cell having the same SN field or waiting a sufficient length of time such that all residual RM cells are cleared from the VC.

The step of assigning new values to CRM and Nrm comprises the step of utilizing a binary search technique to rapidly converge to final values of CRM and Nrm. The step of calculating the RTT utilizes the following equation:

$$CRM = \frac{RTT}{Nrm \cdot \text{Cell\_Time}}$$

wherein the Cell_Time is proportional to the Peak Cell Rate (PCR) of the VC and TM descriptor. In addition, the method further includes the step of varying the transmission rate of each data cell transmitted between RM cells.

BRIEF DESCRIPTION OF THE DRAWINGS

The invention is herein described, by way of example only, with reference to the accompanying drawings, wherein:

FIG. 4 is a diagram illustrating an example transmission of RM cells and data cells;

FIG. 5 is a diagram illustrating the conversion of Ethernet frames into AAL5 frames;

DETAILED DESCRIPTION OF THE INVENTION

Notation Used Throughout

Figure 1:
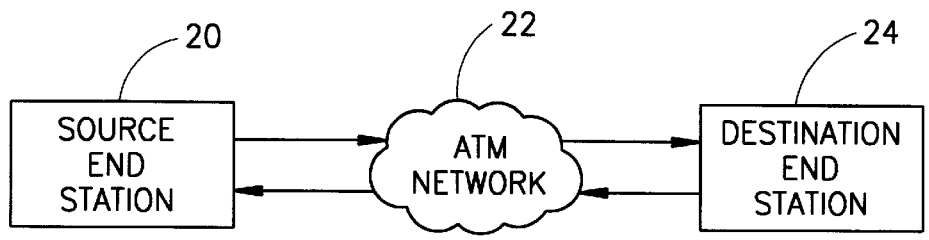
FIG. 1 illustrates an example ATM network including a source end station and a destination end station coupled together by an ATM network.
Figure 2:
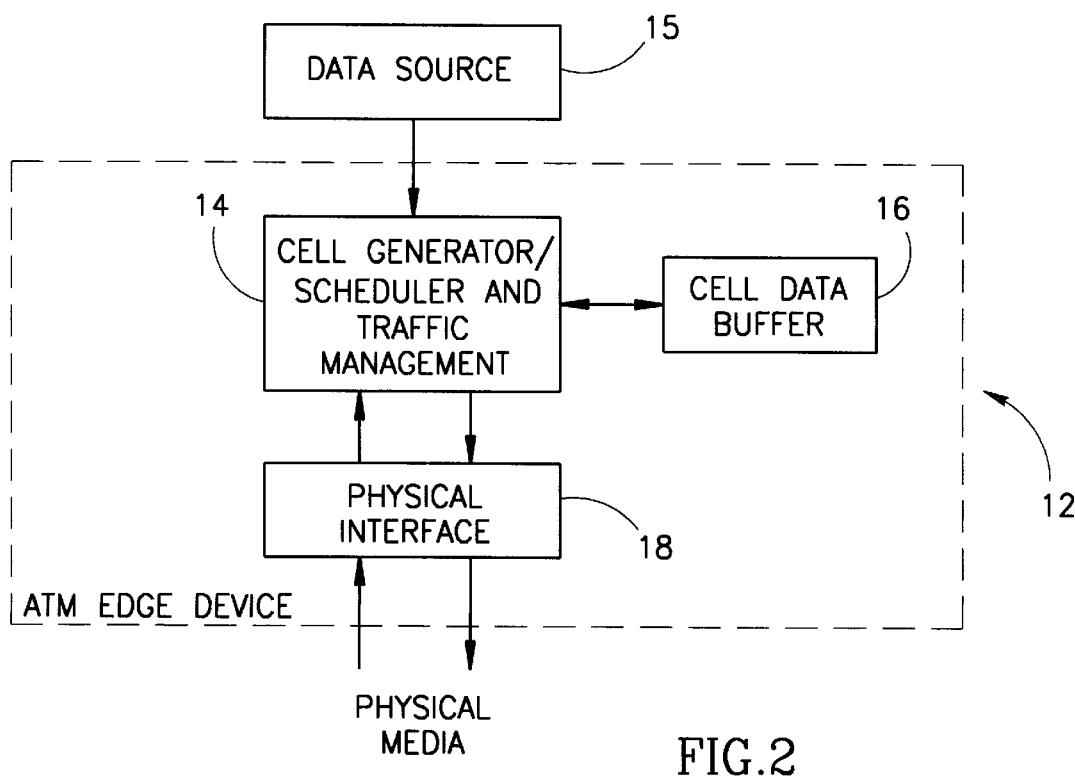
FIG. 2 is a block diagram illustrating a prior art ATM edge device including a cell scheduler coupled to a physical interface and a cell data buffer.
Figure 3:
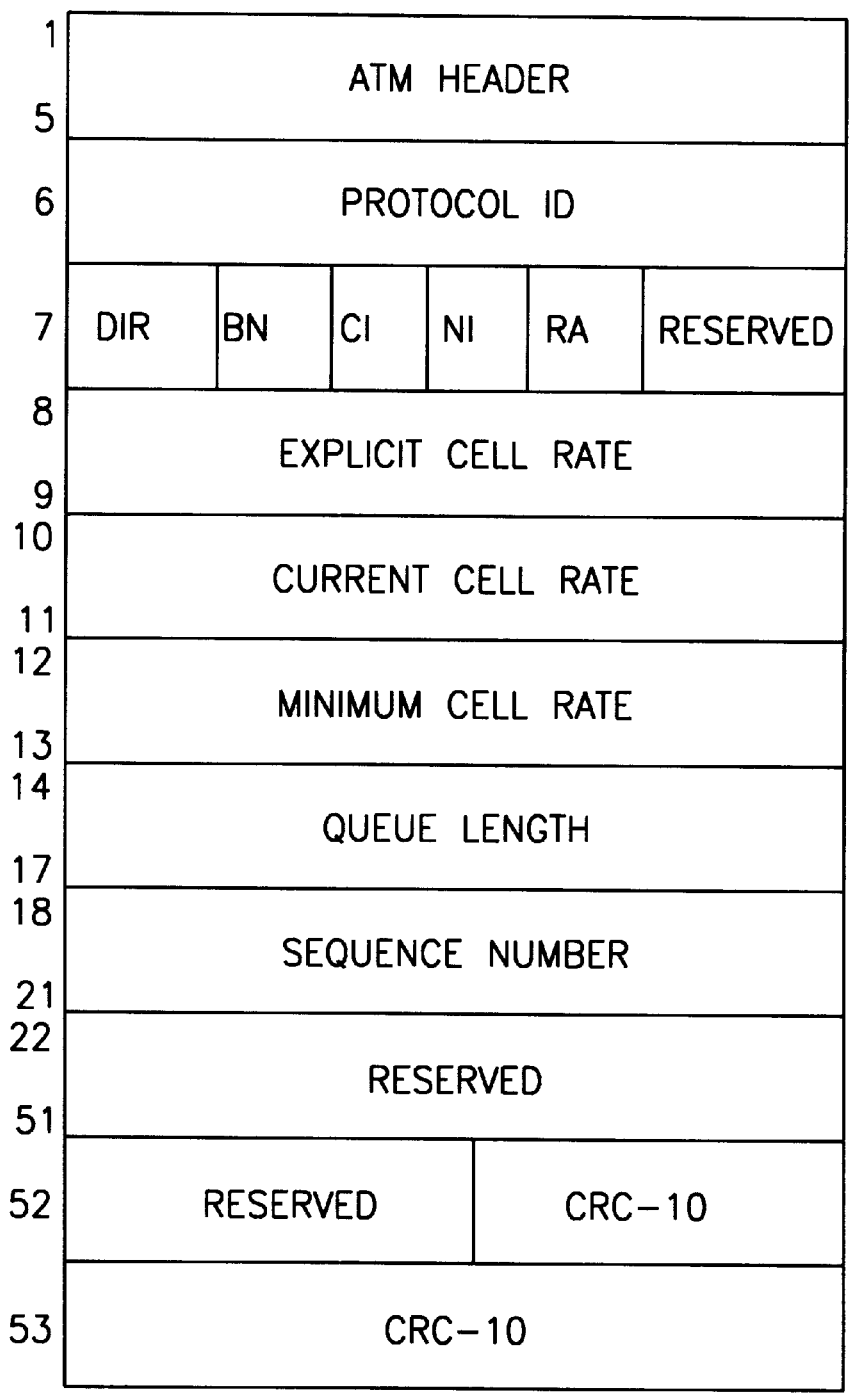
FIG. 3 is a diagram illustrating the field format of a standard Resource Management (RM) cell.

The following notation is used throughout this document.

| Term | Definition |
|---|---|
| ABR | Available Bit Rate |
| ACR | Allowed Cell Rate |
| ADTF | ACR Decrease Time Factor |
| AIR | Additive Increase Rate |
| ANSI | American National Standards Institute |
| ATM | Asynchronous Transfer Mode |
| BECN | Backward Explicit Congestion Notification |
| CBR | Constant Bit Rate |
| CCITT | Comite Consulatif International Telegraphique et Telephonique |
| CCR | Current Cell Rate |
| CDF | Cutoff Decrease Factor |
| CDV | Cell Delay Variation |
| CI | Congestion Indication |
| CLP | Cell Loss Priority |
| CRC | Cyclic Redundancy Check |
| CRM | Missing RM Cell Count |
| CTD | Cell Transfer Delay |
| DES | Destination End Station |
| DR | Direction |
| EFCI | Explicit Forward Congestion Indication |
| ER | Explicit Cell Rate |
| FDDI | Fiber Distributed Data Interface |
| FRTT | Fixed Round Trip Time |
| GFC | Generic Flow Control |
| HEC | Header Error Check |
| ICR | Initial Cell Rate |
| IISP | Interim Inter-Switch Signaling Protocol |
| ILMI | Interim Local Management Interface |
| ITU | International Telecommunications Union |
| LEC | LAN Emulation Client |
| MCR | Minimum Cell Rate |
| Mrm | controls allocation of bandwidth between forward RM cells, backward RM cells and data cells |
| NI | No Increase |
| Nrm | the maximum number of data cells a source may send between two successive RM cells |
| OAM | Operation And Maintenance |
| OSPF | Open Shortest Path First |
| PCR | Peak Cell Rate |
| PNNI | Private Network to Network Interface |
| PT | Payload Type |
| PTI | Payload Type Identifier |
| QL | Queue Length Indicator |
| QoS | Quality of Service |
| RA | Request Acknowledge |
| RDF | Rate Decrease Factor |
| RIF | Rate Increase Factor |
| RM | Resource Management |
| RTT | Round Trip Time |
| SES | Source End Station |
| SN | Sequence Number |
| TBE | Transient Buffer Exposure |
| TCR | Tagged Cell Rate |
| TM | Traffic Management |
| Trm | upper bound on the time between forward RM cells |
| UBR | Unspecified Bit Rate |
| UNI | User to Network Interface |
| VBR | Variable Bit Rate |
| VC | Virtual Circuit |
| VCC | Virtual Channel Connection |
| VCI | Virtual Circuit Identifier |
| VPI | Virtual Path Identifier |
| XDF | Rate Decrease Factor |
| XRM | Missing RM Cell Count (old term) |

General Description

The present invention is a method for calculating the Round Trip Time (RTT) time of a Virtual Circuit (VC) utilizing the Traffic Management (TM) mechanism of ATM. The invention comprises a first embodiment that utilizes the SN field of a RM cell in measuring the RTT and a second embodiment does not utilize the SN field in measuring the RTT. In addition, an application of the method is presented in determining the CRM parameter within the TM descriptor.

The method of the present invention is applicable in networks that implement a Traffic Management (TM) mechanism such as specified by the ATM standard in Traffic Management Specification Version 4.0, incorporated herein by reference. The following is an implementation example of a TM portion of an ATM end station and is not intended to limit the scope of the present invention. The Traffic Management specifications as formed by the ATM Forum specify an end to end congestion control algorithm, i.e., the implicit portion. Three tables may be used for controlling the transmission rate of an individual virtual circuit: (1) Increase table, (2) Decrease table and (3) Xdecrease table.

Note that there are a few useful metrics or parameters when dealing with Quality of Service (QoS) in ATM networks. One of the parameters is the cell delay that can be represented in various ways using the following terms:

1. End to End Transit Delay
2. Cell Delay Variation (CDV)
3. Cell Transfer Delay (CTD)
4. Peak to Peak Cell Delay Variation
5. Cumulative RM Fixed Round Trip Time (FRTT)
6. PNNI Cell Transfer Delay The method teaches a way for measuring the cell RTT in real time for each individual VC independently on an end to end, user to user or LEC to LEC basis.

The traffic for each VC can be controlled as defined by the ATM Forum using Resource Management (RM) cells and the above mentioned three tables. The traffic for each VC flows according to a predefined descriptor which determines the rate increase and decrease that is permitted for the rate transmission of that particular VC. The behavior of a TM descriptor is defined by the parameters discussed above in the Background of the Invention section of this document.

The Increase, Decrease and Xdecrease table mentioned above are used for controlling the rate of transmission of a VC. Each table has 256 entries wherein each entry represents a rate. The content of each of the three tables can be different. The index and representative rate are presented below in Table 1.

TABLE 1

| Index (Dec) | Index (Hex) | Rate (Mbps) |
|---|---|---|
| 0 | 0x00 | 155.000000 |
| 1 | 0x01 | 155.000000 |
| 2 | 0x02 | 155.000000 |
| 3 | 0x03 | 155.000000 |
| 4 | 0x04 | 155.000000 |
| 5 | 0x05 | 155.000000 |
| 6 | 0x06 | 155.000000 |
| 7 | 0x07 | 155.000000 |
| 8 | 0x08 | 155.000000 |
| 9 | 0x09 | 137.777778 |
| 10 | 0x0A | 124.000000 |
| 11 | 0x0B | 112.727273 |
| 12 | 0x0C | 103.333333 |
| 13 | 0x0D | 95.384615 |
| 14 | 0x0E | 88.571429 |
| 15 | 0x0F | 82.666667 |
| 16 | 0x10 | 77.500000 |

TABLE 1-continued

| Index (Dec) | Index (Hex) | Rate (Mbps) |
|---|---|---|
| 17 | 0x11 | 72.941176 |
| 18 | 0x12 | 68.888889 |
| 19 | 0x13 | 65.263158 |
| 20 | 0x14 | 62.000000 |
| 21 | 0x15 | 59.047619 |
| 22 | 0x16 | 56.363636 |
| 23 | 0x17 | 53.913043 |
| 24 | 0x18 | 51.666667 |
| 25 | 0x19 | 49.600000 |
| 26 | 0x1A | 47.692308 |
| 27 | 0x1B | 45.925926 |
| 28 | 0x1C | 44.285714 |
| 168 | 0xA8 | 0.484375 |
| 169 | 0xA9 | 0.472561 |
| 170 | 0xAA | 0.461310 |
| 171 | 0xAB | 0.450581 |
| 172 | 0xAC | 0.440341 |
| 173 | 0xAD | 0.430556 |
| 174 | 0xAE | 0.421196 |
| 175 | 0xAF | 0.412234 |
| 176 | 0xB0 | 0.403646 |
| 177 | 0xB1 | 0.395408 |
| 178 | 0xB2 | 0.387500 |
| 245 | 0xF5 | 0.045696 |
| 246 | 0xF6 | 0.044850 |
| 247 | 0xF7 | 0.044034 |
| 248 | 0xF8 | 0.043248 |
| 249 | 0xF9 | 0.042489 |
| 250 | 0xFA | 0.041756 |
| 251 | 0xFB | 0.041049 |
| 252 | 0xFC | 0.040365 |
| 253 | 0xFD | 0.039703 |
| 254 | 0xFE | 0.039062 |
| 255 | 0xFF | 0.038442 |

Upon a particular event i.e., Congestion Indication (CI), no congestion or RM cell loss, the relevant accessed and a lookup is performed using the VC's current transmission rate, which is represented by 8 bits and thus can be used as an index into the table. Base on the index, contents corresponding to that entry is read and applied as the new current VC transmission rate. On a congestion indication, the Decrease table is used; for no congestion, the Increase table is used; and on RM cell loss (or delay), the Xdecrease table is used.

A second table, Table 2, is presented as a second example of a rate manipulation table. Each rate is represented as an 8-bit integer with the most significant 2 bits representing the prescale and the least significant 6 bits representing the count. Each 8-bit code represents a rate with the table containing 256 entries. Thus, each 8-bit code can be used as an index to one of the 3 tables. The table to use depends on the congestion notification stored in the returning RM cells or upon loss of one or more RM cells. The cell generator/scheduler and traffic management module in an ATM device uses the 8-bit rate to determine current transmission rate.

When accessing a table, the current rate transmission code is use as an index to one of the tables. The contents of the indexed location is used as the next transmission rate. The contents of the tables is setup according to the desired rate increase and decrease behavior as embodied in a formula describing the behavior. For example, if the 8 bit code 0x10 (16 decimal) represents a rate of 77.5 Mbps, upon receiving a RM cell with CI=1, the next rate is decreased by 93% and the contents of location 0x10 in the Decrease table is 0x5C. Upon receiving a RM cell will CI=0, the next rate is increased by 5.16 Mbps, the contents of location 0x10 in the Increase table 0x0F.

The 2 bit prescale represents one of the following four ranges: 8, 1, 1/8 or 1/64. The 6 bit counter represents values 1 through 63. The typical rate values of the following table were calculate using a peak rate of 155 Mbps. Note that the actual peak bit rate in an OC-3 interface is 155 Mbps and the maximum useable data bit rate (not including SONET overhead, etc) is 149.76 Mbps.

TABLE 2

| | Prescale | | | |
|---|---|---|---|---|
| Counter | 8 (00) | 1 (01) | 1/8 (10) | 1/64 (11) |
| | Rate (bps) | | | |
| 0 | stop sending | — | — | — |
| 1 | send now | 155,000,000 | 19,375,000 | 2,421,875 |
| 2 | — | 77,500,000 | 9,687,500 | 1,210,938 |
| 4 | — | 38,750,000 | 4,843,750 | 605,469 |
| 6 | — | 25,833,333 | 3,229,167 | 403,646 |
| 8 | 155,000,000 | 19,375,000 | 2,421,875 | 302,734 |
| 10 | 124,000,000 | 15,500,000 | 1,937,500 | 242,188 |
| 12 | 103,333,333 | 12,916,667 | 1,614,583 | 201,823 |
| 16 | 77,500,000 | 9,687,500 | 1,210,938 | 151,367 |
| 20 | 62,000,000 | 7,750,000 | 968,750 | 121,094 |
| 24 | 51,666,667 | 6,458,333 | 807,292 | 100,911 |
| 28 | 44,285,714 | 5,535,714 | 691,964 | 86,496 |
| 32 | 38,750,000 | 4,843,750 | 605,469 | 75,684 |
| 36 | 34,444,444 | 4,305,556 | 538,194 | 67,274 |
| 40 | 31,000,000 | 3,875,000 | 484,375 | 60,547 |
| 44 | 28,181,818 | 3,522,727 | 440,341 | 55,043 |
| 48 | 25,833,333 | 3,229,167 | 403,646 | 50,456 |
| 52 | 23,846,154 | 2,980,769 | 372,596 | 46,575 |
| 56 | 22,142,857 | 2,767,857 | 345,982 | 43,248 |
| 60 | 20,666,667 | 2,583,333 | 322,917 | 40,365 |
| 63 | 19,682,540 | 2,460,317 | 307,540 | 38,442 |

Round Trip Time Measurement

In any electronic system, the propagation time of the various signals in the electrical traces, wires, semiconductor, etc. are finite and may or may not be critical. In an ATM network, a cell traveling the network ideally has a minimal RTT. The RTT may be larger since the cell might be delayed in one or more buffers and most likely must be processed by network elements and/or edge devices. The method of the present invention provides a way to measure the RTT wherein the RTT measured is not less than the minimal RTT. Thus, the following characterizes the method.

$$\text{measured\_RTT} \geq \text{minimal\_RTT} \quad (1)$$

The method always yields a RTT that is very close to the current actual RTT which takes into account queuing times, processing delays, etc. The measurement may be greater than or equal to the actual RTT but it is never less than it.

The Ambiguity Problem

In order to better understand the principles of the present invention a brief background on the ambiguity problem in networks is presented. With reference to FIG. 1, consider a system comprising Source End Station (SED) 20 and Destination End Station (DES) 24 both connected to a network 22. When the SES transmits a packet (packet A) to the DES, the DES functions to acknowledge its reception, i.e., send an acknowledgement (ACK).

If the SES does not receive the ACK for packet A on time, one of several things may have occurred: (1) packet A may be awaiting transmission at one of the links within the network; (2) packet A may have been correctly received but ACK A may be waiting for transmission at one of the links within the network; or (3) ACK A or packet A may have been dropped or lost by the network.

Now suppose that the SES retransmits packet A after a predetermined TimeOut T and at some time after the retransmission the SES receives ACK A. It this scenario, it is impossible to determine to which transmission event the ACK A belongs to without marking the ACKs. In other words, does the ACK A received belong to the first transmission of packet A or the retransmission of packet A. A more in depth discussion of this problem can be found in Chapter 12 of "An Engineering Approach to Computer Networking," S. Keshav, Addison-Wesley, 1997, incorporated herein by reference.

A diagram illustrating an example transmission of RM cells and data cells is shown in FIG. 4. The example transmission comprises a plurality of RM cells 50 and data cells 52. Each data cell transmitted represents a time slice, whose actual time duration depends on the transmission rate. Thus, the data between two successive RM cells can be viewed as a time axis. If the time arrives to transmit the second RM cell but the previous RM cell has not been received yet (either because of delays from queuing or processing or because of cell loss) it can be concluded that the RTT is larger than (Nrm)×(Cell Transmission Time). Note that an additional cell time should preferably be added to the Cell Transmission Time to compensate for the RM cell processing time in the local edge device. Thus, the method treats a delayed RM cell as a RM cell that was lost.

The method uses the TM mechanism within the ATM standard to determine the RTT. In particular, the method functions to adjust the CRM, Nrm and transmission rate parameters using a binary search technique. The range of values for both the CRM and Nrm parameters is 1 through 32. The CRM and Nrm parameters are chosen in accordance with the well known binary search algorithm, i.e., initially 32 than 16, etc. However, since the value of RTT is usually not large (requiring a CRM of 32), it is preferable to begin the search with a CRM value of 1 and then proceed to higher values. For example, suppose that the appropriate value of CRM is 22, the search sequence will be 1, 2, 4, 8, 16, 32, 24, 20, 22. The Nrm parameter, on the other hand, will start from 32 and decrease downward towards 1 in accordance with the binary search algorithm. The use of the binary search algorithm provides fast convergence for both parameters. Note, however, that other search methods such as those well known in the computer arts are also suitable for use with the present invention. In addition, the user can define the CRM and Nrm patterns.

ATM Adaptation Layer

In ATM networks, it is very common for network elements to use AAL5 for transmitting frames within the ATM network. Consider also that Ethernet frames are received at the edge device from the user. In this case, the number of data cells transmitted for a given Ethernet frame depends on the translation configuration of the device. The following description illustrates one method suitable for use by a network element in translating AAL5 frames to data cells.

With reference to FIG. 5, initially, a frame 60 having a length N (including CRC) is to be converted to AAL5 frame format 62. The CRC field of the frame is omitted resulting in a frame length of N−4. A two byte LEC ID, is appended to the beginning of the frame which becomes the CPCS-PDU payload in the final AAL5 frame 64. In addition, a one byte CPCS-UU, one byte PCI, two byte Length and a newly calculated four byte CRC are added to the frame resulting in a new length of N−4+2+2+1+1+4=N+6 bytes. A pad of P byt added to the new AAL5 frame so that N+6+P divides by 48 with no remainder, i.e., (N+6+P) mod 48=0. This number is the PDU of the new AAL5 frame. Thus, the number of cells to be transmitted is N+6+P/48. A five-byte header is attached to each cell in accordance with ATM standards.

The longest Ethernet frame, 1500 bytes, is translated to 32 ATM cells. Therefore, depending on the TM mechanism implementation, in order to generate two RM cells per frame (corresponding to the maximal Nrm parameter 32) a frame length longer than the maximum Ethernet frame length as defined by the 802.3 standard committee is needed. Thus, the method of the invention may utilize a maximum value of 31 for the Nrm parameter but can optionally be 32. Note that this is implementation specific. For example, considering a frame length of 1500 bytes and Nrm of 31, it is certain that two RM cells will be generated. With a Nrm of 32 it is not certain and depends on the specific SES TM mechanism implementation. Note also that network devices transmit data on a frame boundary basis only, i.e., once a device begins transmitting a frame, transmission of frames associated with other VCs does not occur until transmission of the current frame is complete. In other words, cell interleaving of data from different frames of different VCs is avoided.

Note that since it is known exactly how many data cells and RM cells are generated from each Ethernet frame, the exact number of data cells to be generated until the next RM cell is generated can be traced and known for certain. In addition, it can be known certainly how long the Ethernet frame should be.

Flushing the VC

Recall that Ethernet frames are passed to the TM mechanism and that each frame is segmented into a plurality of ATM cells and injected into VC with interleaved RM cells. The TM mechanism functions to check for returning RM cells. On the absence of returning RM cells, the transmission rate is decreased after a timeout indication. The above description applies for a single session. Convergence to the measured RTT is achieved by adjusting the CRM and Nrm parameters from one iteration to the next. Note that each session is comprised of multiple iterations.

The method presented herein, bases the measurement of the RTT on the time it takes for cells to propagate through the network. It is thus very important that the VC does not have any residual RM cells or related ACKs in the network. Note that ACKs are RM cells with Backward notification set. As described hereinabove, however, an ambiguity problem arises between successive iterations. It is important that legacy RM cells be cleared from the test VC before initiating an iteration. To achieve this, the VC is flushed of any and all old RM cells. Since the RM cells have no identity, old RM cells cannot be distinguished from new RM cells.

The method of the present invention provides three techniques for flushing a VC. These will now be described in more detail.

The first VC flushing technique uses an OAM cell in its loopback mode. Since (1) the PTI field within the ATM cells header of an OAM cell is different from that of a RM cell, and (2) since no cell bypassing occurs in ATM networks within VCs, flushing can be achieved by injecting an OAM cell and subsequently receiving it in return. After receiving the OAM cell it is known with certainty that the VC is free of old RM cells.

The second VC flushing technique uses the SN field for identification only. The use of the SN field for identification only eliminates the need to implement management of the SN field, i.e., using a database for recording the cells in transit (the cells currently in the network) on a VC basis. Only a single counter is required to be implemented for all VCs, i.e., only 32 memory elements are needed. It is important to note that the TM specification specifies that the SN field should be incremented for each successive RM cell Thus, the implementation of this technique, i.e., the use of a single counter, violates the standard. This may or may not be critical in the implementation of the invention.

Another option is to use a RM cell with a fixed value in its SN field, e.g., 20, each time the VC is flushed using this specific RM cell throughout all the edge devices. Note that this technique too, violates the ATM standard.

The third VC flushing technique uses the SN field without having a management mechanism, i.e., no database is needed for storing transmission and reception events. Rather, confirmation that the VC was flushed is achieved by sending and receiving a RM cell with the same SN value each time. Note that SN set to zero signifies RTT session and SN set to one signifies flushing. Note also that although the SN is either zero or one, the VPI/VCI is used for VC identification purposes.

It is important to note that the need to flush the VC can be avoided if a sufficient time is waited between two successive measurements. The definition of sufficient varies between different network topologies and implementations. In any case, this delay time should be taken into account when calculating the overall time of the methods presented herein.

With reference to Table 2 and the discussion presented above of the determination of the transmission rate within the TM mechanism, it is pointed out that each entry of Table 2 represents a transmission rate. The contents of each entry is an 8-bit rate code. The contents of each entry is the actual rate to be used next based on the current rate. For example, if the current rate is 155 Mbps represented by the 8 bit code 8 and it is determined that the next rate upon congestion will be 124 Mbps, then the value 10 is placed in location 08 ($8^{th}$ index) within the Decrease table.

Placing the index value itself in the contents of the table can neutralize any rate and index. For example, if the value 10 is placed in location 10, than no influence on the rate of the device will occur.

Assume further that the value 10 (corresponding to 124 Mbps) is placed in location 8 (corresponding to 155 Mbps) of the Decrease table; the value 40 (corresponding to 31 Mbps) is placed in location 8 of the Xdecrease table; and the value 16 (corresponding to 77.5 Mbps) is placed in location 8 of the Increase table.

An RM cell is transmitted at the current rate of 155 Mbps (the bit code of the value 8). If after transmission, the transmission rate value decreases to 124 Mbps we know with certainty that the Decrease table was accessed and that the RM cell returned with its CI bit equal to one.

If, on the other hand, after transmission, the transmission rate value decreases to 31 Mbps, we know with certainty that the Xdecrease table was accessed and that the RM cell was either lost or did not arrive in time. The next RM cell is to be transmitted before receiving the previous RM cell due to, for example, the RM cell being delayed or waiting in a queue.

Further, if, after transmission, the transmission rate decreases to 77.5 Mbps we know with certainty that the Increase table was accessed and that the RM cell returned with the CI bit cleared.

Figure 6:
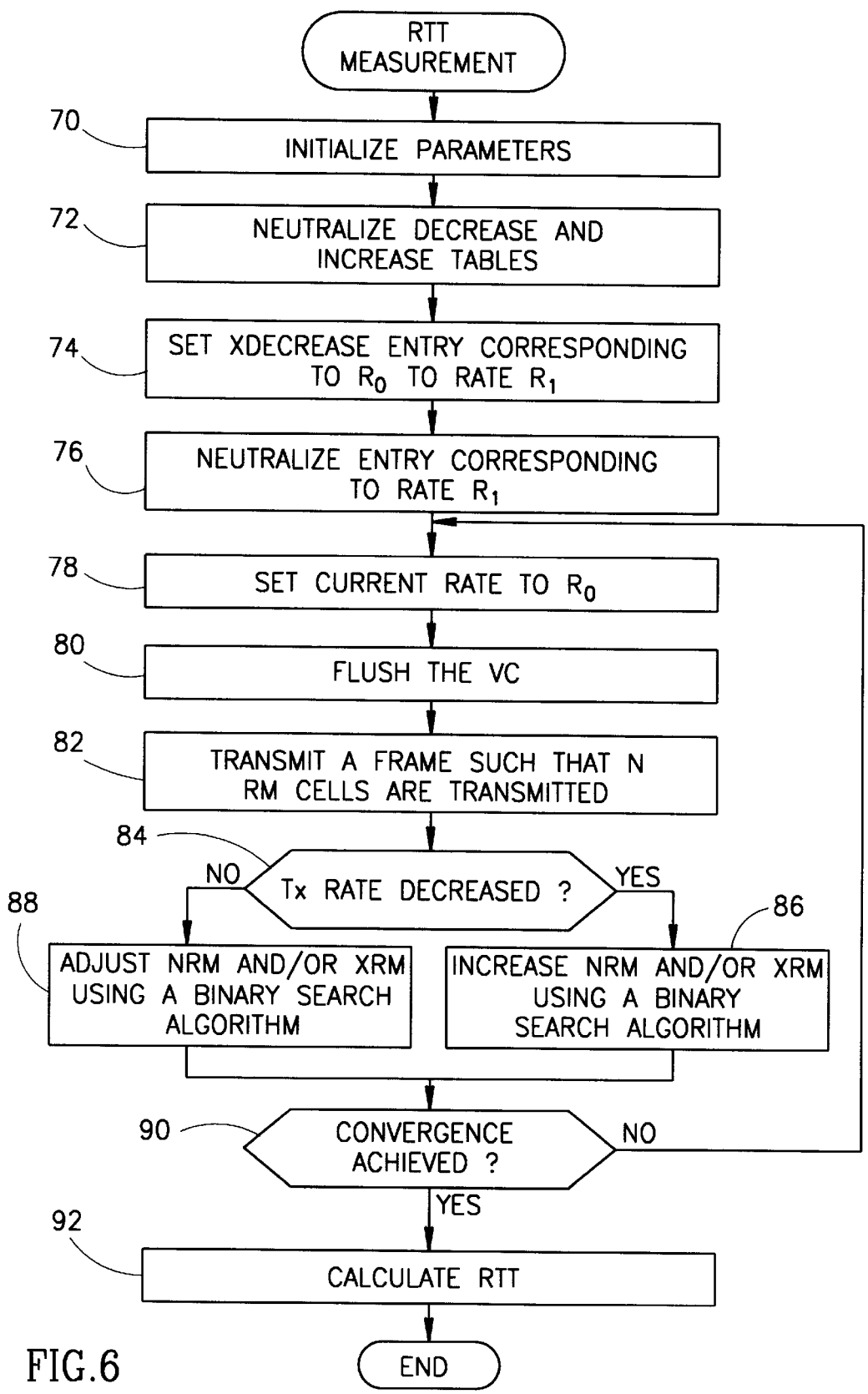
FIG. 6 is a flow diagram illustrating the Round Trip Time measurement method of the present invention.

A test VC session for RTT measurement purposes is defined as the set of actions taken to determine the RTT in accordance with the method described below. A flow diagram illustrating the Round Trip Time measurement method of the present invention is shown in FIG. 6. The first step is to initialize various parameters and entities (step 70).

1. the CRM parameter is initialized to one or can optionally be modified by the user to a different default value;
2. the Nrm parameter is initialized to 32 or can optionally be modified by the user to a different default value;

After initialization, the Decrease and the Increase tables are neutralized as described previously above (step 72). Next, the Xdecrease entry corresponding to rate $R_0$ is set to rate $R_1$ (step 74). The entry corresponding to rate $R_1$ is neutralized by placing the value of $R_1$ in entry $R_1$ (step 76). The current rate is then set to $R_0$ (step 78). Note that $R_0$ can be modified by the user to a different default value. The VC is then flushed with flushing repeated before each iteration (step 80). VC flushing is achieved using any of the three techniques described previously above, e.g., using an OAM cell or any other suitable manner supported by the network. In addition, flushing can be effectively achieved by waiting a sufficient amount of time such that any residual RM cells are cleared from the VC.

Next, a frame is transmitted such that two RM cells are transmitted (step 82). If, after transmission, the transmission rate decreases, it means that the second RM cell did not arrive on time, either because (1) it got lost indicating congestion or (2) the RTT is longer that the 'time' distance represented by the transmission time between the two RM cells transmitted.

If the transmission rate decreases (step 84), it means that CRM is to be increased in accordance with the Binary Search algorithm and the process is to be repeated (step 86).

If the transmission rate did not decrease (step 84), the Nrm and CRM parameters are assigned new values (step 88). The two parameters are assigned new values in accordance with the Binary Search algorithm. For example, if CRM is set to 2 and Nrm set to 1, then the new CRM is set to 1 and the new Nrm set to 32. In the event that the rate does not change during the next iteration, the values of CRM and Nrm are set to 1 (no change) and 16, respectively.

Note that optionally the RTT measurement can be performed between more than two RM cells. Doing so reduces the effects of random fluctuations in the system.

Note that before each iteration, the current rate should be set to $R_0$ (step 78). If convergence has not been achieved, the method continues with step 78. Once CRM and Nrm are adjusted, it is then checked whether convergence has been achieved (step 90). Once convergence to the final CRM and Nrm is achieved, i.e., the binary search algorithm has converged, the RTT is calculated as defined by the system implementation (step 92).

It is important to note that the method shown in FIG. 6 maintains the transmit rate for each cell within a session. Preferably, however, each data cell transmitted between two RM cells can be transmitted at a different rate. This permits much finer tuning of the RTT measurement and subsequently the XRM parameter.

Figure 7:
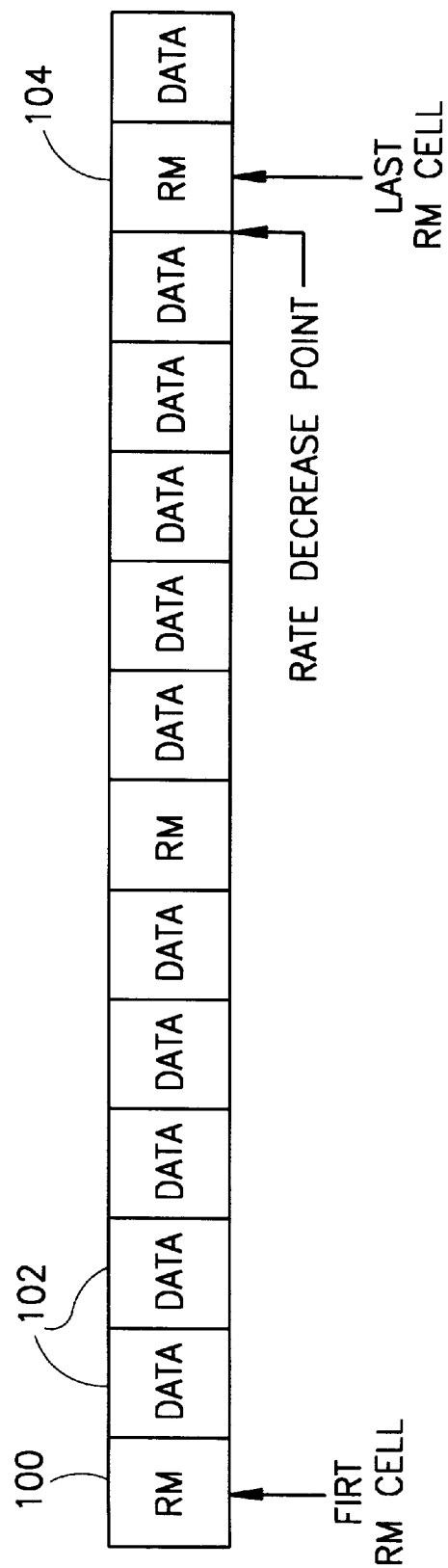
FIG. 7 is a diagram illustrating a transmission of RM cells and data cells associated with the RTT measurement method of the present invention.

A diagram illustrating a transmission of RM cells and data cells associated with the RTT measurement method of the present invention is shown in FIG. 7. Referring to FIG. 7 as an example, if the rate decreases at the point in time labeled 'Rate Decrease Point', then the RTT is calculated as shown below.

$$RTT=10 \cdot (data\_cell\_Tx\_time)+(RM\_cell\_Tx\_time) \quad (2)$$

The data_cell_Tx_time is multiplied by 10 since 10 data cells have been transmitted up to the Rate Decrease Point.

The RTT measurement session algorithm has numerous applications in related networking areas, some of which are described below. First, the measurement method can be used in a method for automatically setting up the CRM parameter of a TM descriptor. Second, the measurement method can be used in a method for determining in real time the RTT between two edge devices in the network. Third, the measurement method can be used to maintain a VC between all LECs and continuously measuring the RTT utilizing the TM mechanism described above.

As an option, in connection with sending dummy Ethernet frames so as to generate RM cells for the measurement of the RTT, a CRC error can be purposely placed in the Ethernet frame that is reassembled at the destination. This causes the MAC layer (layer 2) in the destination to drop the frame and prevent it from reaching the upper layers.

In addition, when establishing a VC between LECs and the BUS, it is important to flush (using OAM cells, for example) the VC between the LECs from any residual RM cells once the RTT measurement is complete but before sending any application data.

Figure 8:
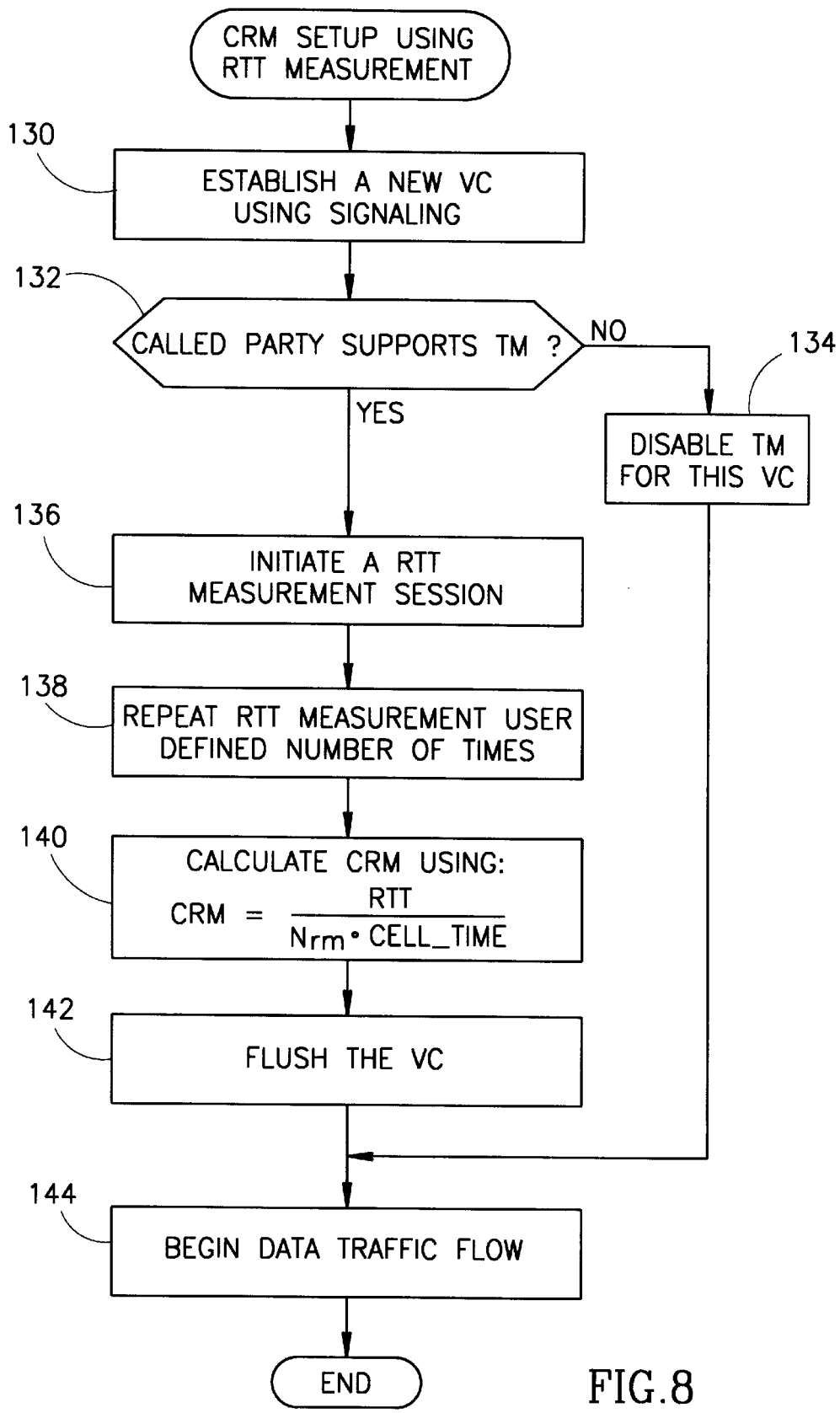
FIG. 8 is a flow diagram illustrating a first example application of the RTT measurement method of the present invention.

For illustrative purposes, an example of the first mentioned application of the RTT measurement method described above of automatically setting up the CRM parameter of a TM descriptor will now be presented. A flow diagram illustrating a first example application of the RTT measurement method of the present invention is shown in FIG. 8. The first step is to establish a new VC utilizing standard ATM signaling (step 130). Next, it is checked whether the called party, i.e., the edge device on the other end of the VC, supports Traffic Management (step 132). It is determined that the called party supports TM if the RM cell transmitted is received with Backward Indication set. If the called party does not support TM, then TM is disabled for this particular VC (step 134) and data traffic is permitted to flow (step 144).

If TM is supported by the calling and called party, i.e., that both end stations of the VC support TM, a RTT measurement session is initiated (step 136). The RTT measurement is optionally repeated N number of times with (N settable by the user) (step 138). Once the RTT is determined (using an average of all the measurements thus reducing the effects of random fluctuations), the CRM parameter is calculated using the following.

$$CRM = \frac{RTT}{Nrm \cdot Cell\_Time} \quad (3)$$

The Cell_Time is proportional to the Peak Cell Rate (PCR) of that particular VC and TM descriptor. Note that if cells were transmitted with different transmission rates, then the Cell_Time is the aggregate time of the cells.

The VC is then flushed using any suitable technique such as any of the three described supra (step 142). Once the VC is flushed, regular ATM traffic is permitted to flow through the new VC. Note that before data is transmitted, a flush frame is transmitted (in accordance with the LANE specification) on the VC to the BUS.

Figure 9:
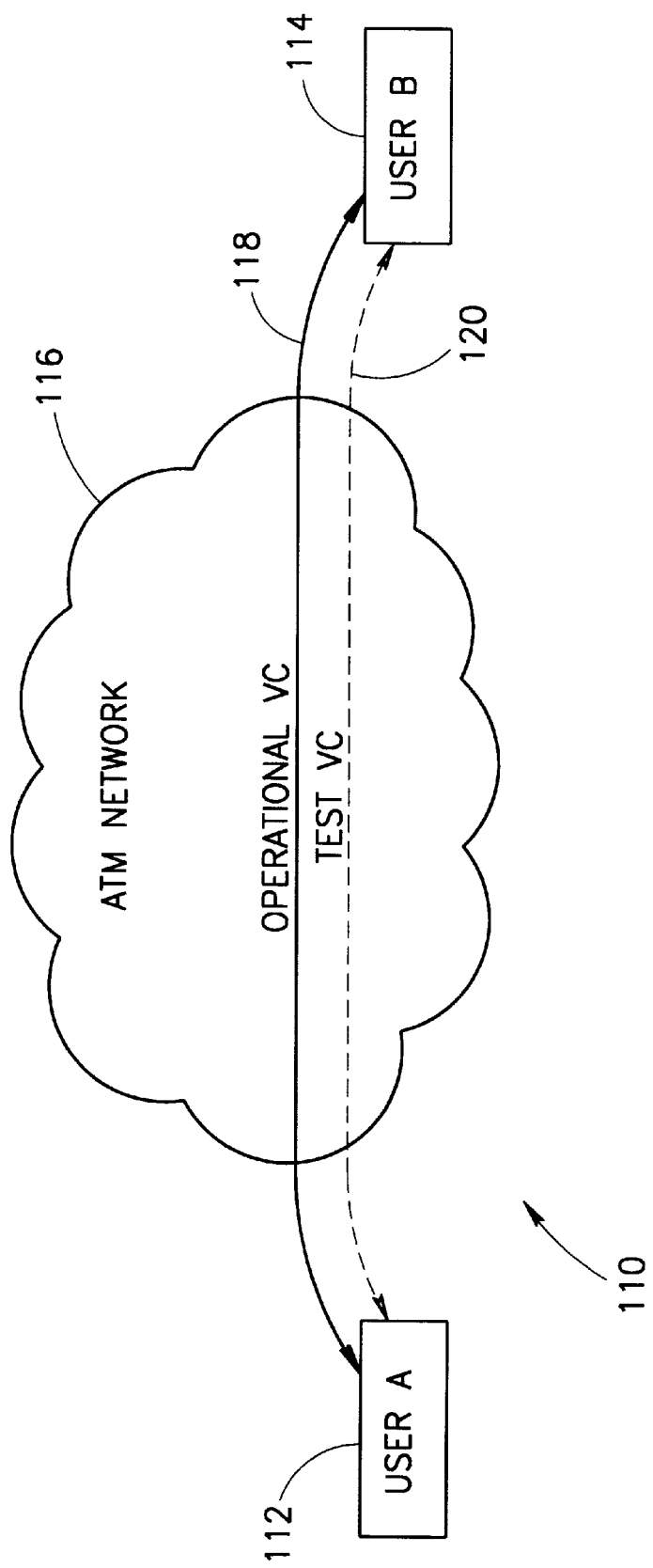
FIG. 9 is an example ATM network whereby both an operational VC and a test VC are established.

For illustrative purposes, an example of the second mentioned application of the RTT measurement method described in determining in real time the RTT between two edge devices in the network will now be presented. An example ATM network whereby both an operational VC and a test VC are established is shown in FIG. 9. The example ATM network, generally referenced 110, comprises two users: user A 112 and user B 114, an ATM network cloud 116, an operational VC 118 and a test VC 120.

First, a VC is established between the two users, which may, for example comprise LECs, within the 'user' abstractions described above. This VC is labeled the operational VC 118. A second new VC is established between the two users. This second VC has substantially the same route as the first one and is labeled the test VC 120. RM cells are generated on the second or test VC which are returned by the remote user. In operation, the CRM facilities, i.e., CRM table, of the source user is used to decrease the transmission rate of the VC if the RM cell is delayed.

Note that optionally, the starting point of the RTT measurement method described above, can be chosen to correspond with the last measured RTT value. An Exponential Averaging Filter, well known in the networking arts, can also be utilized to filter the RTT values measured.

As a sender sends a series of packets, it receives a series of acknowledgements (ACKs), and thus accumulates a series of RTT measurements. Instead of using the last measured RTT to set the timer, the series is smoothed to eliminate random fluctuations, i.e., noise. A known technique for doing so is based on the exponential averaging filter, which is described in more detail in Chapter 12 of "An Engineering Approach to Computer Networking," S. Keshav, Addison-Wesley, 1997, incorporated herein by reference.

If r(k) represents the measured value of the RTT using the kth packet, and a is a tuning parameter in the range [0,1], then the output of the filter is a smooth RTT estimate s(k) given by the following:

$$s(k)=as(k-1)+(1-a)r(k) \quad (4)$$

In other words, the estimate adds a fraction of the new RTT to itself, retaining a fraction a of past history. The closer a is to 1.0, the larger the weight placed on past history, with a correspondingly smaller dependence on recent measurements. Thus, if the RTTs vary quickly, choosing a small a allows the estimate to track the input quickly. Conversely, if RTTs vary slowly, choosing a large a allows the estimate to ignore most of the noise.

A better estimate for the timeout is based on the mean deviation in the RTT. An additional error term e(k) is maintained in addition to its smoothed estimate m(k). These quantities are computed as follows:

$$s(k)=(1-a)r(k)+as(k-1)$$

$$e(k)=s(k)-r(k)|$$

$$m(k)=(1-a)e(k)+am(k-1)$$

$$timeout(k)=s(k)+bm(k) \quad (5)$$

The term m measures the mean deviation from the mean and is an estimate of the standard deviation in r. If the distribution of the RTTs is approximately Gaussian, then a packet is expected to be processed with time s+bm, where different values of b yield different confidence intervals.

It is important to note that there are no requirements placed on the switches along the route other than the source end station. A disadvantage, however, is that this method required another VC (the test VC) which utilizes additional system resources. Further, the tolerance of the RTT measurement is approximately ±0.5 cell time.

While the invention has been described with respect to a limited number of embodiments, it will be appreciated that many variations, modifications and other applications of the invention may be made.

What is claimed is:

1. A method of measuring round trip time of a virtual circuit utilizing a traffic management descriptor within an Asynchronous Transfer Mode Traffic Management mechanism, said traffic management descriptor including a CRM parameter representing a missing resource management cell count and a Nrm parameter representing the maximum number of data cells a source may send between two successive resource management cells, said method comprising the steps of:

initializing said CRM parameter and said Nrm parameter in said traffic management descriptor;

neutralizing Decrease and Increase tables within said Traffic Management mechanism;

setting a transmission rate associated with said virtual circuit to a first rate value;

setting a Xdecrease table entry corresponding to said first rate value to a second rate value;

neutralizing the entry corresponding to said second rate value;

flushing said virtual circuit;

transmitting a plurality of data cells such that a first resource management cell and a second resource management cell are transmitted;

increasing the value of said CRM parameter if the transmission rate decreases indicating that said second resource management cell did not arrive in time due to loss or round trip time being longer than the time between said first resource management cell and said second resource management cell;

assigning new values to said CRM parameter and said Nrm parameter if the transmission rate did not increase; and calculating a value for said round trip time once both said CRM parameter and said Nrm parameter converge.

2. The method according to claim 1, wherein said step of neutralizing the entry corresponding to said second rate value comprises the step of placing said second rate value in an entry corresponding to said second rate value.

3. The method according to claim 1, wherein said step of flushing said virtual circuit comprises the step of using an Operation And Maintenance (OAM) cell in loopback mode.

4. The method according to claim 1, wherein said step of flushing said virtual circuit comprises the step of using a Sequence Number (SN) field of a resource management cell for identification purposes, wherein a single counter is implemented for all virtual circuits.

5. The method according to claim 1, wherein said step of flushing said virtual circuit comprises the step of using a Sequence Number (SN) field of a resource management cell to confirm whether the virtual circuit was flushed by sending and receiving a resource management cell having the same Sequence Number field.

6. The method according to claim 1, wherein said step of flushing said virtual circuit comprises the step of waiting a sufficient length of time such that all residual resource management cells are cleared from the virtual circuit.

7. The method according to claim 1, wherein said step of assigning new values to said CRM parameter and said Nrm parameter comprises the step of utilizing a binary search technique to rapidly converge to final values thereof.

8. The method according to claim 1, wherein said round trip time is calculated using $$CRM = \frac{RTT}{Nrm \cdot Cell\_Time}$$

wherein the Cell_Time is proportional to the Peak Cell Rate (PCR) of said virtual circuit and said traffic management descriptor.

9. The method according to claim 1, further comprising the step of varying the transmission rate of each cell transmitted between resource management cells.

10. A method of measuring round trip time of a virtual circuit utilizing a traffic management descriptor within an Asynchronous Transfer Mode Traffic Management mechanism, said traffic management descriptor including a CRM parameter representing a missing resource management cell count and a Nrm parameter representing the maximum number of data cells a source may send between two successive resource management cells, said method comprising the steps of:

flushing said virtual circuit;

transmitting a plurality of data cells such that a first resource management cell and a second resource management cell are transmitted;

increasing the value of said CRM parameter if the transmission rate decreases indicating that said second resource management cell did not arrive in time due to loss or round trip time being longer than the time between said first resource management cell and said second resource management cell;

assigning new values to said CRM parameter and said Nrm parameter if the transmission rate did not increase; and calculating a value for said round trip time once both said CRM parameter and said Nrm parameter converge.

11. The method according to claim 10, wherein said step of flushing said virtual circuit comprises the step of using an Operation And Maintenance (OAM) cell in loopback mode.

12. The method according to claim 10, wherein said step of flushing said virtual circuit comprises the step of using the Sequence Number (SN) field of a resource management cell for identification purposes, wherein a single counter is implemented for all virtual circuits.

13. The method according to claim 10, wherein said step of flushing said virtual circuit comprises the step of using the Sequence Number (SN) field of a resource management cell to confirm whether the virtual circuit was flushed by sending and receiving a resource management cell having the same Sequence Number field.

14. The method according to claim 10, wherein said step of flushing said virtual circuit comprises the step of waiting a sufficient length of time such that all residual resource management cells are cleared from the virtual circuit.

15. The method according to claim 10, wherein said step of assigning new values to said CRM parameter and said Nrm parameter comprises the step of utilizing a binary search technique to rapidly converge to final values thereof.

16. The method according to claim 10, wherein said round trip time is calculated using $$CRM = \frac{RTT}{Nrm \cdot Cell\_Time}$$

wherein the Cell_Time is proportional to the Peak Cell Rate (PCR) of said virtual circuit and said traffic management descriptor.

17. The method according to claim 10, further comprising the step of varying the transmission rate of each cell transmitted between resource management cells.

18. A method of setting up a CRM parameter of a traffic management descriptor associated with a virtual circuit within an Asynchronous Transfer Mode Traffic Management mechanism, said traffic management descriptor including said CRM parameter representing a missing resource management cell count and a Nrm parameter representing the maximum number of data cells a source may send between two successive resource management cells, said method comprising the steps of:

establishing a virtual circuit;

measuring round trip time by initializing said CRM parameter and said Nrm parameter in said traffic management descriptor, neutralizing Decrease and Increase tables within said Traffic Management mechanism, setting a transmission rate associated with said virtual circuit to a first rate value, setting a Xdecrease table entry corresponding to said first rate value to a second rate value, neutralizing the entry corresponding to said second rate value, flushing said virtual circuit, transmitting a plurality of data cells such that a first resource management cell and a second resource management cell are transmitted, increasing the value of said CRM parameter if the transmission rate decreases indicating that said second resource management cell did not arrive in time due to loss or round trip time being longer than the time between said first resource management cell and said second resource management cell, assigning new values to said CRM parameter and said Nrm parameter if the transmission rate did not increase, calculating a value for said round trip time once both said CRM parameter and said Nrm parameter converge;

setting said CRM parameter to round trip time/(Nrm× cell_time), wherein cell_time is proportional to the Peak Cell Rate (PCR) of said virtual circuit and said traffic management descriptor;

flushing said virtual circuit; and permitting data traffic to flow through said virtual circuit.

19. The method according to claim 18, wherein said step of measuring round trip time is repeated a predetermined number of times and said CRM parameter is set using an average of a plurality of round trip time measurements.

* * * * *